Patented Oct. 8, 1935

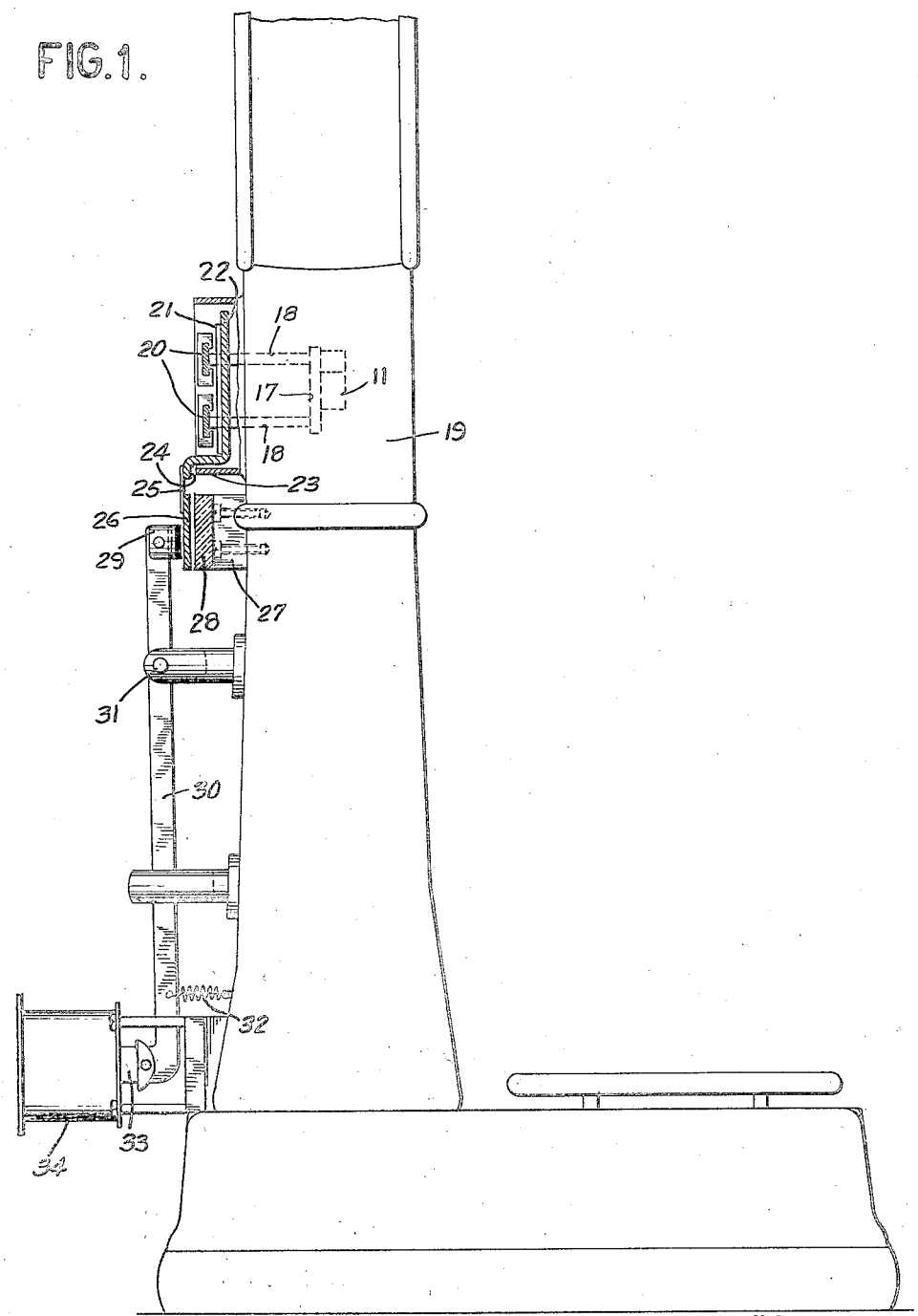

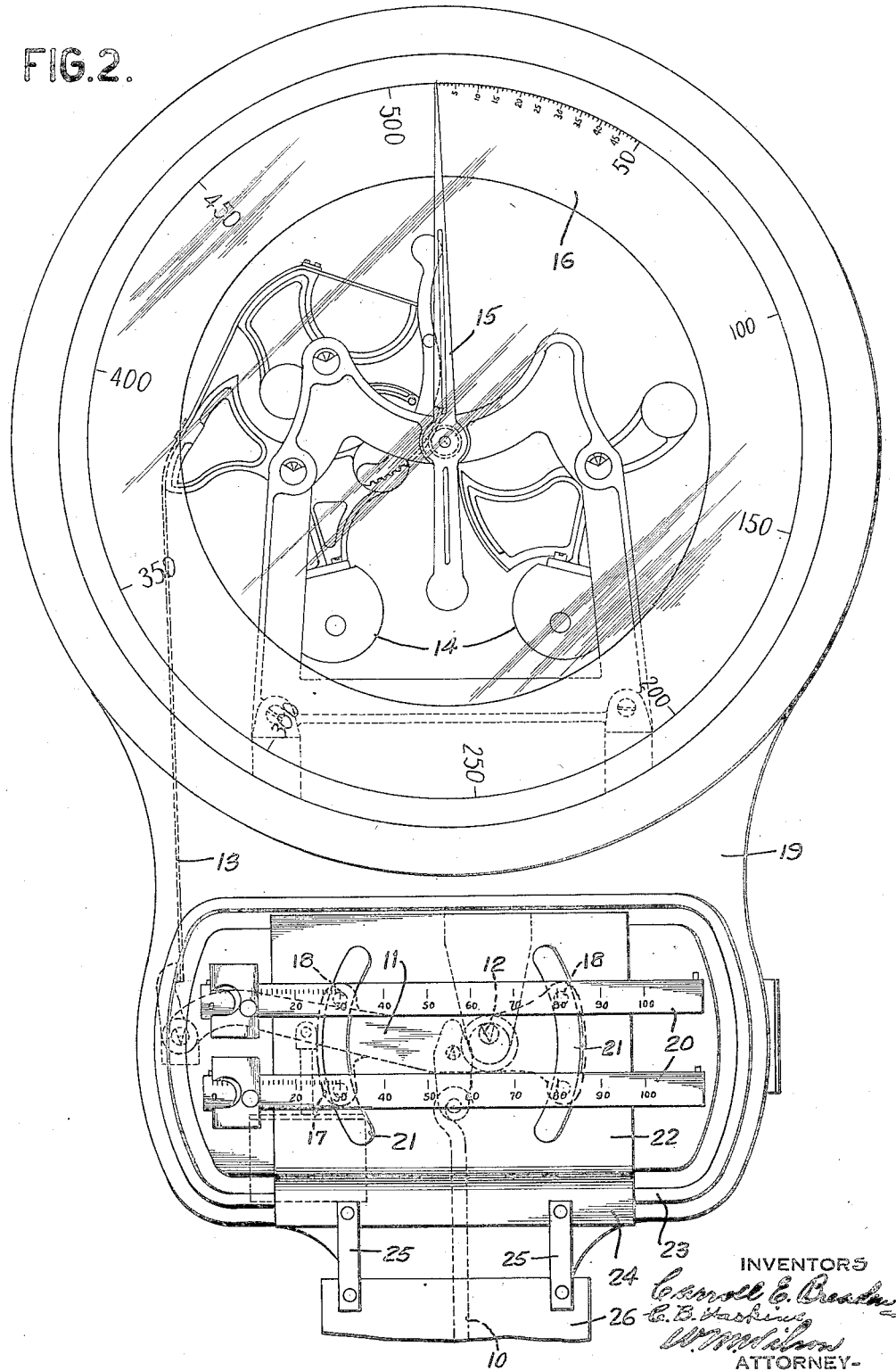

2,016,703

UNITED STATES PATENT OFFICE 2,016,703

SCALE LOCK

Carroll E. Breaden and Clifford B. Haskins, Dayton, Ohio, assignors, by mesne assignments, to International Business Machines Corporation, New York, N. Y., a corporation of New York Application March 15, 1932, Serial No. 598,998

5 Claims. (Cl. 265—27)

This case relates to an attachment for weighing scales.

It is often desirable to lock an indicator in the position to which it has been actuated under the influence of a variable or momentary load so as to retain the reading after the load has been removed or changed.

The object of the invention is to provide novel means for locking an indicator in actuated position.

Further the object is to provide an electrical device for locking the indicator.

Still further, the object is to lock an indicator by means effecting its purpose with a minimum of shock to the indicator.

Further and other objects and advantages will be hereinafter set forth in the accompanying specification and claims, and shown in the drawings, which by way of illustration show what is now considered to be the preferred embodiment of the invention.

In the drawings:

Figure 1 is a side view of the scale with parts of the locking device in section, and Figure 2 is an elevation of the upper part of the scale from the side provided with the locking device.

Referring to the drawings in detail, the load is applied through draft rod 10 to an intermediate beam 11, fulcrumed at 12 and connected by tape 13 to the pendulum structure 14 which operates the indicator 15 scanning chart 16. Secured by plates 17 to the side of the intermediate beam 11 are rods 18 extending exteriorly of the housing 19. The outer extremities of the rods 18 carry tare beams 20. Intermediate the housing and beam, the rods rigidly carry plates 21 to which is fixed a plate 22 formed with a bend at its lower end to extend horizontally beyond the front edge of the bottom flange 23 of the tare beam guard and then vertically downward to provide a portion 24.

Fixed to this portion are two flexible strips 25 preferably of spring brass and to the latter is fixed a rigid steel plate 26. In back of plate 26, the housing rigidly carries a bracket 27 which is faced with a formica block 28. In front of plate 26 is an element 29 faced with insulating material, the element being pinned to the upper end of a lever 30, which is pivoted to the frame at 31 and normally urged by a spring 32 to rock counterclockwise. The lower end of the lever 30 is pinned to the plunger 33 of a solenoid coil 34.

Spring 32 holds the element 29 spaced from plate 26 while spring strips 25 hold the plate 26 vertical and away from the formica block 28. Normally, therefore, there is no interference with the movement of plate 26 and the load responsive elements connected thereto.

When it is desired to hold the load responsive elements stationary, a circuit is closed through solenoid 34 which operates its plunger 33 to rock lever 30 clockwise thus engaging element 29 with plate 26 and clamping the latter against formica block 28. The plate 26 being clamped, the beams 10 20 and 11 are held stationary and accordingly the automatic counterbalancing and indicating system is also locked in position.

When plate 26 is clamped, in the manner described the shock is absorbed by the flexing of spring strips 25, thus avoiding transmission of the shock to the automatic counterbalancing and indicating system which is delicately mounted.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims:

1. In a scale, weighing mechanism including an element normally responsive to a load, an electrically controlled clamping mechanism, and a yieldable shock dampening device connected to said element and engageable by said clamping mechanism to hold the element against movement, said device yielding in a direction to absorb the shock of its engagement with the clamping mechanism so as to prevent transmission of the said shock to the said element and said weighing mechanism.

2. In a scale, a beam, a plate carried thereby, a flexible strip carried by the plate, a second plate carried by the strip, clamping means for gripping said second plate, and a lever for operating said clamping means.

3. In a scale, a beam, a plate carried thereby, a flexible strip carried by the plate, a second plate carried by the strip, a clamping device including members on opposite sides of the second plate, one of said members being fixed, the other of said members being carried by a lever, and an electrical coil for operating said lever.

4. In a scale, a beam, a flexible device fixedly carried by the beam and extending longitudinally thereof, the device being flexible only in a direction transverse to a vertical plane parallel to the direction of movement of the beam, and clamping means movable transversely of said plane to engage and clamp said device against movement and positively arrest the beam in position, the device flexing in aforesaid direction to absorb the shock of engagement and prevent transmission of the shock to the beam.

5. In a scale such as defined in claim 4, said flexible device comprising a flat spring metal plate between the clamping means and the beam.

CARROLL E. BREADEN.
CLIFFORD B. HASKINS.